United States Patent
Kuang

(10) Patent No.: US 9,380,095 B2
(45) Date of Patent: Jun. 28, 2016

(54) METHOD AND APPARATUS FOR PLAYING STREAMING MEDIA FILE

(71) Applicant: Huawei Device Co., Ltd., Shenzhen (CN)

(72) Inventor: Yunsheng Kuang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 274 days.

(21) Appl. No.: 14/107,133

(22) Filed: Dec. 16, 2013

(65) Prior Publication Data

US 2014/0115115 A1 Apr. 24, 2014

Related U.S. Application Data

(63) Continuation of application No. PCT/CN2012/083333, filed on Oct. 22, 2012.

(51) Int. Cl.
*H04L 29/06* (2006.01)
*H04L 29/08* (2006.01)
(Continued)

(52) U.S. Cl.
CPC .......... *H04L 65/602* (2013.01); *H04L 65/1083* (2013.01); *H04L 67/148* (2013.01); *H04N 21/4331* (2013.01); *H04N 21/64707* (2013.01);
(Continued)

(58) Field of Classification Search
CPC ......... H04L 41/00; H04L 43/00; H04L 51/00; H04L 61/00; H04L 65/00; H04L 67/00; H04L 69/00; H04L 65/602; H04L 65/1083; H04L 67/148; H04L 65/1059; H04L 65/1096; H04N 21/00; H04N 21/8456; H04N 21/4331; H04N 21/64707
See application file for complete search history.

(56) References Cited

U.S. PATENT DOCUMENTS 8,954,597 B2 * 2/2015 Wong ............................ 709/231
2007/0067808 A1 3/2007 DaCosta
(Continued)

FOREIGN PATENT DOCUMENTS

CN 101668182 A 3/2010
CN 102204219 A 9/2011
(Continued)

OTHER PUBLICATIONS

Foreign Communication From a Counterpart Application, European Application No. 12877605.1 Extended European Search Report dated Sep. 8, 2014, 6 pages.
(Continued)

*Primary Examiner* — Wing F Chan
*Assistant Examiner* — Billy H Ng
(74) *Attorney, Agent, or Firm* — Conley Rose, P.C.; Grant Rodolph

(57) ABSTRACT

A method for playing a streaming media file, which can improve transmission and playing efficiency of a streaming media file. The method includes: playing, by a first apparatus, a streaming media file from a streaming media server; and when the first apparatus receives a handover instruction, sending, by the first apparatus, a playing command to a second apparatus, and sending at least a part of data of the downloaded streaming media file to the second apparatus, where the at least part of the data includes data not played by the first apparatus, where the playing command is used to instruct the second apparatus to play a part of or all of the at least part of the data sent by the first apparatus. The present invention further provides a corresponding apparatus.

7 Claims, 4 Drawing Sheets

(51) Int. Cl.
*H04N 21/433* (2011.01)
*H04N 21/647* (2011.01)
*H04N 21/845* (2011.01)

(52) U.S. Cl.
CPC ........ *H04N 21/8456* (2013.01); *H04L 65/1059* (2013.01); *H04L 65/1096* (2013.01)

(56) References Cited

U.S. PATENT DOCUMENTS

| | | | | |
|---|---|---|---|---|
| 2007/0153740 A1* | 7/2007 | Chang | ............... | H04L 29/06027 370/331 |
| 2010/0030808 A1* | 2/2010 | Ress | .................... | H04L 67/303 709/227 |
| 2011/0099593 A1* | 4/2011 | Kim | .................. | H04N 7/17318 725/93 |
| 2012/0016965 A1* | 1/2012 | Chen | ................ | H04N 21/23439 709/219 |
| 2012/0050012 A1* | 3/2012 | Alsina | ................ | H04N 21/4126 340/10.1 |
| 2012/0110167 A1* | 5/2012 | Joch | ........................ | H04L 65/80 709/224 |
| 2012/0209961 A1* | 8/2012 | McCoy | .............. | H04N 21/4333 709/219 |

FOREIGN PATENT DOCUMENTS

| | | | |
|---|---|---|---|
| CN | 102298947 A | 12/2011 | |
| CN | 102404644 A | 4/2012 | |
| CN | 201110401959 | * 6/2012 | ............. G06F 9/445 |

OTHER PUBLICATIONS

Foreign Communication From a Counterpart Application, PCT Application No. PCT/CN2012/083333, English Translation of Chinese Search Report dated Jul. 25, 2013, 2 pages.

Foreign Communication From a Counterpart Application, PCT Application No. PCT/CN2012/083333, Chinese Written Opinion dated Jul. 25, 2013, 4 pages.

Partial English Translation and Abstract of Chinese Patent Application No. CN102404644A, Jun. 4, 2014, 43 pages.

\* cited by examiner

METHOD AND APPARATUS FOR PLAYING STREAMING MEDIA FILE

CROSS-REFERENCE TO RELATED APPLICATIONS

This application is a continuation of International Application No. PCT/CN2012/083333, filed on Oct. 22, 2012, which is hereby incorporated by reference in its entirety.

TECHNICAL FIELD

The present invention relates to the field of data transmission, and specifically, to a method and an apparatus for playing a streaming media file.

BACKGROUND

With the quick development of Internet technologies and services, the number and types of streaming media files, including music, films, teleplays, news, homemade videos, and the like, has become increasingly abundant, thereby greatly enriching visual and aural experiences of subscribers. Currently, when playing a streaming media file, increasingly more home network devices have a content sharing function, that is, a streaming media file played on a device may be handed over to another home network device for being played.

With the content sharing function, through a handover procedure, a subscriber pushes a streaming media file to a screen of any home network device on which he/she wants to watch the file.

However, during the handover procedure, a home network device playing the streaming media file before playing handover may already acquire data of the streaming media file after a playing stop point, but a home network device playing the streaming media file after the playing handover still needs to acquire the data of the streaming media file after the playing stop point again, so that transmission and playing efficiency of the streaming media file is caused to be relatively low.

SUMMARY

Embodiments of the present invention provide a method and an apparatus for playing a streaming media file, which can improve transmission and playing efficiency of a streaming media file.

According to a first aspect of the present invention, a method for playing a streaming media file is provided, where the method includes: playing, by a first apparatus, a streaming media file from a streaming media server; and if the first apparatus receives a handover instruction, sending, by the first apparatus, a playing command to a second apparatus, and sending at least a part of the data of the downloaded streaming media file to the second apparatus, where the at least a part of the data includes data not played by the first apparatus, where the playing command is used to instruct the second apparatus to play a part of or all of the at least a part of the data sent by the first apparatus.

In a first possible implementation manner of the first aspect, if the streaming media file downloaded by the first apparatus is continuous in time, the method further includes: determining, by the first apparatus, first position information of the downloaded streaming media file, where the first position information indicates a position of a last complete data packet of the downloaded streaming media file, where the data not played by the first apparatus is specifically data in the downloaded streaming media file from a playing stop point to the position indicated by the first position information.

In combination with the first possible implementation manner of the first aspect, in a second possible implementation manner, if the downloaded streaming media file is incomplete, after the first apparatus receives the handover instruction, the method further includes: sending the first position information and address information that is of the downloaded streaming media file to the second apparatus, where the first position information and the address information that is of the streaming media file are used for the second apparatus to acquire a part of or all of the data except for the at least a part of the data from the streaming media server.

In a third possible implementation manner of the first aspect, if the streaming media file downloaded by the first apparatus is discontinuous in time, the method further includes: receiving, by the first apparatus, a cache record list sent by a server, and performing updating, where the data not played by the first apparatus is specifically data in a segment storage block which is identified as being cached in the updated cache record list but is not released; and if the downloaded streaming media file is incomplete, after receiving the handover instruction, sending, by the first apparatus, to the second apparatus, the updated cache record list and address information that corresponds to data in a non-cached segment storage block in the updated cache record list, where the updated cache record list and the address information that corresponds to the data in the non-cached segment storage block are used for the second apparatus to acquire a part of or all of the data except for the at least a part of the data from the streaming media server.

In a fourth possible implementation manner of the first aspect, if the streaming media file downloaded by the first apparatus is discontinuous in time, the method further includes: receiving, by the first apparatus, a cache record list sent by a server, and performing updating, where the data not played by the first apparatus is specifically data in a segment storage block which is identified as being cached in the updated cache record list but is not released; and if the downloaded streaming media file is incomplete, after receiving the handover instruction, sending, by the first apparatus, the updated cache record list and address information that is of the second apparatus to the server, where the updated cache record list and the address information that is of the second apparatus are used for the streaming media server to send data in a non-cached segment storage block in the updated cache record list to the second apparatus.

In combination with any possible implementation manner in the first possible implementation manner of the first aspect to the fourth possible implementation manner of the first aspect, in a fifth possible implementation manner of the first aspect, when determining that a data amount or a duration of the downloaded streaming media file satisfies a preset condition, the first apparatus sends the at least a part of the data of the downloaded streaming media file to the second apparatus.

According to a second aspect of the present invention, a method for playing a streaming media file is provided, where the method includes: receiving, by a second apparatus, a playing command sent by a first apparatus when the first apparatus receives a handover instruction, and at least a part of the data of a streaming media file downloaded by the first apparatus from a streaming media server, where the at least a part of the data includes data not played by the first apparatus; and playing, by the second apparatus, according to the playing command, a part of or all of the at least a part of the data sent by the first apparatus.

In a first possible implementation manner of the second aspect, if the streaming media file downloaded by the first apparatus is continuous in time and is incomplete, the method further includes: receiving, by the second apparatus, first position information and address information that is of the downloaded streaming media file that are sent by the first apparatus, where the first position information indicates a position of a last complete data packet of the downloaded streaming media file; and acquiring, by the second apparatus, according to the first position information and the address information that is of the downloaded streaming media file, a part of or all of the data except for the at least a part of the data from the streaming media server.

In a second possible implementation manner of the second aspect, if the streaming media file downloaded by the first apparatus is discontinuous in time and is incomplete, the method further includes: receiving, by the second apparatus, a cache record list and address information that corresponds to data in a non-cached segment storage block in the cache record list that is sent by the first apparatus; and acquiring, by the second apparatus, according to the cache record list and the address information that corresponds to the data in the non-cached segment storage block, a part of or all of the data except for the at least a part of the data from the streaming media server.

In a third possible implementation manner of the second aspect, if the streaming media file downloaded by the first apparatus is discontinuous in time and is incomplete, the method further includes: receiving, by the second apparatus, data in a non-cached segment storage block in a cache record list sent by the streaming media server, where the cache record list is sent by the first apparatus to a server.

In combination with any possible implementation manner in the first possible implementation manner of the second aspect to the third possible implementation manner of the second aspect, in a fourth possible implementation manner of the second aspect, when determining that a data amount or a duration of the downloaded streaming media file satisfies a preset condition, the first apparatus sends the at least a part of the data of the downloaded streaming media file to the second apparatus.

According to a third aspect of the present invention, an apparatus for playing a streaming media file is provided, where the apparatus is a first apparatus and the apparatus includes: a receiver configured to receive a handover instruction; a memory configured to cache a streaming media file from a streaming media server; a player configured to play the streaming media file from the streaming media server; a processor configured to, when the receiver receives the handover instruction, generate a playing command, and determine at least a part of the data which is of the downloaded streaming media file and needs to be sent to a second apparatus, where the playing command is used to instruct the second apparatus to play a part of or all of the at least a part of the data sent by the first apparatus, and the at least a part of the data includes data not played by the first apparatus; and a sender configured to send, to the second apparatus, the playing command and the at least a part of the data which is of the downloaded streaming media file and is determined by the processor.

In a first possible implementation manner of the third aspect, the processor is further configured to, if the streaming media file downloaded by the first apparatus is continuous in time, determine first position information of the downloaded streaming media file, where the first position information indicates a position of a last complete data packet of the downloaded streaming media file.

In combination with the first possible implementation manner of the third aspect, in a second possible implementation manner of the third aspect, the sender is further configured to, when the downloaded streaming media file is incomplete, and after the receiver receives the handover instruction, send the first position information and address information that is of the downloaded streaming media file to the second apparatus, where the first position information and the address information that is of the streaming media file are used for the second apparatus to acquire a part of or all of the data except for the at least a part of the data from the streaming media server.

In a third possible implementation manner of the third aspect, the receiver is further configured to, when the streaming media file downloaded by the first apparatus is discontinuous in time, receive a cache record list sent by a server, and perform updating; and the sender is further configured to, when the downloaded streaming media file is incomplete, and after the receiver receives the handover instruction, send, to the second apparatus, the updated cache record list and address information that corresponds to data in a non-cached segment storage block in the updated cache record list, where the updated cache record list and the address information that corresponds to the data in the non-cached segment storage block are used for the second apparatus to acquire a part of or all of the data except for the at least a part of the data from the streaming media server.

In a fourth possible implementation manner of the third aspect, the receiver is further configured to, if the streaming media file downloaded by the first apparatus is discontinuous in time, receive a cache record list sent by a server, and perform updating; and the sender is further configured to, when the downloaded streaming media file is incomplete, and after the receiver receives the handover instruction, send the updated cache record list and address information that is of the second apparatus to the server, where the updated cache record list and the address information that is of the second apparatus are used for the streaming media server to send data in a non-cached segment storage block in the updated cache record list to the second apparatus.

In combination with any possible implementation manner in the first possible implementation manner of the third aspect to the fourth possible implementation manner of the third aspect, in a fifth possible implementation manner, the sender is specifically configured to, when the first apparatus determines that a data amount or a duration of the downloaded streaming media file satisfies a preset condition, send the at least a part of the data of the downloaded streaming media file to the second apparatus.

According to a fourth aspect of the present invention, an apparatus for playing a streaming media file is provided, where the apparatus includes: a receiver configured to receive a playing command sent by a first apparatus when the first apparatus receives a handover instruction, and at least a part of the data of a streaming media file downloaded by the first apparatus from a streaming media server, where the at least a part of the data includes data not played by the first apparatus; and a player configured to play, according to the playing command, a part of or all of the at least a part of the data sent by the first apparatus.

In a first possible implementation manner of the fourth aspect, the receiver is further configured to, when the streaming media file downloaded by the first apparatus is continuous in time and is incomplete, receive first position information and address information that is of the downloaded streaming media file that are sent by the first apparatus, and acquire, according to the first position information and the address information that is of the downloaded streaming media file, a part of or all of the data except for the at least a part of the data from the streaming media server, where the first position information indicates a position of a last complete data packet of the downloaded streaming media file.

In a second possible implementation manner of the fourth aspect, the receiver is further configured to, when the streaming media file downloaded by the first apparatus is discontinuous in time and is incomplete, receive a cache record list and address information that corresponds to data in a non-cached segment storage block in the cache record list that are sent by the first apparatus, and acquire, according to the cache record list and the address information that corresponds to the data in the non-cached segment storage block, a part of or all of the data except for the at least a part of the data from the streaming media server.

In a third possible implementation manner of the fourth aspect, the receiver is further configured to, when the streaming media file downloaded by the first apparatus is discontinuous in time and is incomplete, receive data in a non-cached segment storage block in a cache record list sent by the streaming media server, where the cache record list is sent by the first apparatus to a server.

In combination with any possible implementation manner in the first possible implementation manner of the fourth aspect to the third possible implementation manner of the fourth aspect, in a fourth possible implementation manner of the fourth aspect, the receiver is specifically configured to, when the first apparatus determines that a data amount or a duration of the downloaded streaming media file satisfies a preset condition, receive the at least a part of the data which is of the downloaded streaming media file and is sent by the first apparatus.

By adopting the foregoing technical solutions, in the method and the apparatus for playing a streaming media file according to the embodiments of the present invention, the at least a part of the data of the downloaded streaming media file is sent to the second apparatus, where the at least a part of the data includes the data not played by the first apparatus, and therefore, the second apparatus may play a part of or all of the at least a part of the data sent by the first apparatus. In this manner, the part of the data which is of the downloaded streaming media file and is stored in the first apparatus is effectively utilized, thereby reducing a data amount which is of the streaming media file and needs to be acquired by the second apparatus, and improving the transmission and playing efficiency of the streaming media file.

BRIEF DESCRIPTION OF DRAWINGS

To describe the technical solutions in the embodiments of the present invention or in the prior art more clearly, accompanying drawings required for describing the embodiments or the prior art are briefly introduced in the following. Apparently, the accompanying drawings in the following description merely show some embodiments of the present invention, and persons of ordinary skill in the art can further obtain other drawings according to these accompanying drawings without creative efforts.

DESCRIPTION OF EMBODIMENTS

The technical solutions of the embodiments of the present invention are clearly described in the following with reference to the accompanying drawings in the embodiments of the present invention. Obviously, the embodiments to be described are only a part rather than all of the embodiments of the present invention. All other embodiments obtained by persons skilled in the art based on the embodiments of the present invention without creative efforts shall fall within the protection scope of the present invention.

Figure 1:
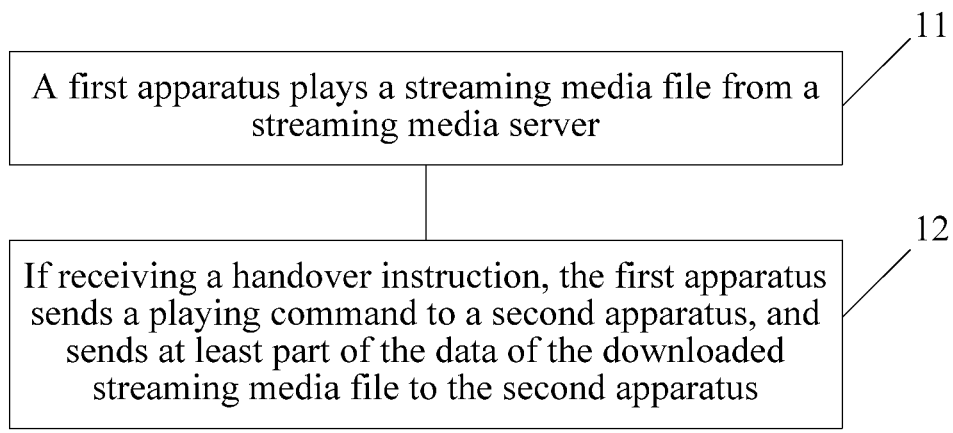
FIG. 1 is a flowchart of a method for playing a streaming media file according to an embodiment of the present invention.

FIG. 1 is a flowchart of a method for playing a streaming media file according to an embodiment of the present invention. Referring to FIG. 1, an embodiment of the present invention provides a method for playing a streaming media file, where the method may include:

11: A first apparatus plays a streaming media file from a streaming media server.

Before the step, the first apparatus may download the streaming media file from the streaming media server, and may save data of the streaming media file in a cache or a temporary file.

12: If receiving a handover instruction, the first apparatus sends a playing command to a second apparatus, and sends at least a part of the data of the downloaded streaming media file to the second apparatus, where the at least a part of the data includes data not played by the first apparatus.

The playing command is used to instruct the second apparatus to play a part of or all of the at least a part of the data sent by the first apparatus.

In the embodiment of the present invention, if in step 12, when the first apparatus sends the playing command to the second apparatus, the first apparatus already downloads all data of the streaming media file from an Internet media server, the first apparatus may send all the data of the downloaded streaming media file to the second apparatus. After receiving all the data of the streaming media file, the second apparatus may start playing. If in step 12, when the first apparatus sends the playing command to the second apparatus, the first apparatus does not download all the data of the streaming media file from the streaming media server, the first apparatus may send a part of the data of the downloaded streaming media file to the second apparatus.

It should be noted that, in the embodiment of the present invention, a device playing the streaming media file before playing handover is called a first apparatus, and a device playing the streaming media file after the playing handover is called a second apparatus. The first apparatus may be some compact and portable mobile terminal devices, including a smartphone, a tablet computer, a personal digital assistant (PDA) and the like. These apparatuses are easy to be operated, and can easily acquire a streaming media file from a network side, but a screen size is small, a resolution is low, and it is difficult to obtain a better visual experience. The second apparatus may be some relatively large devices having excellent display characteristics, for example, a high definition smart television. These devices have features including a large screen size and high resolution, and may play a high definition media program, so as to enable a subscriber to obtain a better visual experience.

In the method for playing a streaming media file provided by the embodiment of the present invention, the at least a part of the data of the downloaded streaming media file is sent to the second apparatus, where the at least a part of the data includes the data not played by the first apparatus, and therefore, the second apparatus may play a part of or all of the at least a part of the data sent by the first apparatus. In this manner, the part of the data which is of the downloaded streaming media file and is stored in the first apparatus is effectively utilized, thereby reducing a data amount which is of the streaming media file and needs to be acquired by the second apparatus, and improving transmission and playing efficiency of the streaming media file.

In addition, during a playing handover procedure from the first apparatus to the second apparatus, in the prior art, a series of operations, including connection establishment, authentication, capability negotiation, and the like, may be performed between the second apparatus and the Internet media server, and these operations need to consume certain time, so that a situation, such as buffer and delay, is caused to occur during the handover procedure, thereby causing playing of a media program to be interrupted, and affecting a viewing experience of the subscriber. However, in the embodiment of the present invention, in this case, when the streaming media file is handed over from the first apparatus to the second apparatus for being played, when performing interaction with the streaming media server to request to transmit data, the second apparatus may play the part of the data which is of the downloaded streaming media file and is transmitted by the first apparatus, thereby implementing stable handover of playing pictures of the streaming media file, and preventing occurrences of buffering and interruption of playing during the handover.

It should be noted that, there are the following two manners for the first apparatus to download the data of the streaming media file: One is continuous downloading, that is, data which is of the streaming media file and is transmitted from the streaming media server to the first apparatus continuously, and subsequent data can be transmitted only after the preceding data is downloaded; the other one is discontinuous downloading, that is, data which is of the streaming media file and is transmitted from the streaming media server to the first apparatus discontinuously. In this case, the streaming media server segments data of the entire streaming media file, and performs transmission by using a media data storage block as a unit. In this case, the streaming media server delivers a cache record list to the first apparatus, which is used for the first apparatus to record a state of the media data storage block at any time.

Therefore, after receiving the handover instruction, the first apparatus may determine, according to whether the cache record list is acquired, whether the downloaded streaming media file is continuous in time, so as to select a subsequent processing manner. Specifically, if acquiring the cache record list from the streaming media server, the first apparatus determines that the downloaded streaming media file is discontinuous in time; on the contrary, if not acquiring the cache record list from the streaming media server, the first apparatus determines that the downloaded streaming media file is continuous in time.

In the following, two situations in which the downloaded streaming media file is continuous and discontinuous in time are separately described.

Optionally, in an embodiment of the present invention, if the streaming media file downloaded by the first apparatus is continuous in time, besides including the foregoing step 11 and step 12, the method for playing a streaming media file provided by the embodiment of the present invention may further include: determining, by the first apparatus, first position information of the downloaded streaming media file, where the first position information indicates a position of a last complete data packet of the downloaded streaming media file, where the data not played by the first apparatus is specifically data in the downloaded streaming media file from a playing stop point to the position indicated by the first position information.

In the embodiment of the present invention, the "complete data packet" may be a frame of data, or a piece of content data fragment, or a moving picture experts group (MPEG) transport stream (TS) packet.

Further, after determining the first position information of the downloaded streaming media file, the first apparatus may determine, according to the first position information, whether the downloaded streaming media file is complete. Specifically, the first apparatus determines whether the position indicated by the first position information is an end position of the streaming media file. If the position indicated by the first position information is the end position of the streaming media file, the first apparatus determines that the downloaded streaming media file is complete; if the position indicated by the first position information is not the end position of the streaming media file, the first apparatus determines that the downloaded streaming media file is incomplete.

If the downloaded streaming media file is incomplete, after the first apparatus receives the handover instruction, the method may further include: sending the first position information and address information that is of the downloaded streaming media file to the second apparatus, where the first position information and the address information that is of the streaming media file are used for the second apparatus to acquire a part of or all of the data except for the at least a part of the data from the streaming media server.

Optionally, in another embodiment of the present invention, if the streaming media file downloaded by the first apparatus is discontinuous in time, besides including the foregoing step 11 and step 12, the method for playing a streaming media file provided by the embodiment of the present invention may further include: receiving, by the first apparatus, a cache record list sent by a server, and updating the cache record list according to data which is of the streaming media file and is downloaded from the streaming media server; specifically, updating by the first apparatus, the cache record list once the first apparatus downloads complete data in a segment storage block from the streaming media server: identifying the segment storage block as being cached in the cache record list, where the data not played by the first apparatus is specifically data in a segment storage block which is identified as being cached in the cache record list but is not released; if the downloaded streaming media file is incomplete, after receiving the handover instruction, sending, by the first apparatus, to the second apparatus, the updated cache record list and address information that corresponds to data in a non-cached segment storage block in the updated cache record list; where the updated cache record list and the address information that corresponds to the data in the non-cached segment storage block are used for the second apparatus to acquire a part of or all of the data except for the at least a part of the data from the streaming media server.

The first apparatus may determine, according to the cache record list, whether the downloaded streaming media file is complete. Specifically, if the non-cached segment storage block does not exist in the cache record list, it indicates that the downloaded streaming media file is complete; on the contrary, if the non-cached segment storage block exists in the cache record list, it indicates that the downloaded streaming media file is incomplete.

The address information corresponding to the data in the non-cached segment storage block in the cache record list may be included in the cache record list, and is sent to the second apparatus together with the cache record list.

In the embodiment of the present invention, the complete streaming media file is segmented according to a time sequence, and data corresponding to each segment is called a segment storage block. A segment storage block is formed by one or several complete data packets. During data transmission, data is transmitted from the streaming media server to a receiving device by using the segment storage block as a unit.

The "not released segment storage block" refers to a segment storage block which is already stored in a storage medium of the receiving device and is not discarded yet. If media content corresponding to the segment storage block is already played, data of the segment storage block is discarded.

The method for playing a streaming media file provided by this embodiment is applicable to a situation that data acquired from a network media server is not continuously downloaded according to the time sequence, and can reduce a data amount which is of the streaming media file and is acquired by the second apparatus from the Internet media server.

Optionally, in still another embodiment of the present invention, if the streaming media file downloaded by the first apparatus is discontinuous in time, besides including the foregoing step 11 and step 12, the method for playing a streaming media file provided by the embodiment of the present invention may further include: receiving, by the first apparatus, a cache record list sent by a server, and updating the cache record list according to data which is of the streaming media file and is downloaded from the streaming media server; specifically, updating, by the first apparatus, the cache record list once the first apparatus downloads complete data in a segment storage block from the streaming media server: identifying the segment storage block as being cached in the cache record list, where the data not played by the first apparatus is specifically data in a segment storage block which is identified as being cached in the updated cache record list but is not released; if the downloaded streaming media file is incomplete, after receiving the handover instruction, sending, by the first apparatus, the updated cache record list and address information of the second apparatus to the server, where the updated cache record list and the address information of the second apparatus are used for the streaming media server to send data in a non-cached segment storage block in the updated cache record list to the second apparatus.

After receiving the updated cache record list and the address information that is of the second apparatus, the server communicates with the streaming media server, so as to notify the streaming media server of data which is of the streaming media file and needs to be sent to the second apparatus.

The address information of the second apparatus may be IP address information of the second apparatus, and may also be other address information that may identify the second apparatus.

The method for playing a streaming media file provided by this embodiment is applicable to a situation that data acquired from a network media server is not continuously downloaded according to a time sequence, and can reduce a data amount which is of the streaming media file and is sent by the streaming media server to the second apparatus.

It should be noted that, in each of the foregoing embodiments, in step 12, before sending the at least a part of the data of the downloaded streaming media file to the second apparatus, the first apparatus may first determine whether a data amount or a duration of the downloaded streaming media file satisfies a preset condition. When determining that the data amount or the duration of the downloaded streaming media file satisfies the preset condition, the first apparatus sends the at least a part of the data of the downloaded streaming media file to the second apparatus. The preset condition, for example, may be whether the duration of the downloaded streaming media file reaches a designated threshold, and the designated threshold may be any value in a certain range set according to a requirement, for example, any value from 2 to 5 seconds; for another example, the preset condition may be whether the data amount of the downloaded streaming media file reaches a designated threshold, and the designated threshold is, for example, 1M-5M.

When determining that the data amount or the duration of the downloaded streaming media file does not satisfy the preset condition, the first apparatus sends address information and second position information that are of the streaming media file to the second apparatus, where the second position information indicates a position of a first data packet of a non-played part of the streaming media file. In this manner, the second apparatus may request, according to the address information and the second position information, the streaming media server to transmit corresponding data of the streaming media file. It should be noted that position information in the embodiment of the present invention is not limited to a position in time, and may also be a position in another measurement.

It should be noted that, in each of the foregoing embodiments, the first apparatus and the second apparatus may be in a same local area network. Because a data transmission speed of two apparatuses in the same local area network is quite high, and is generally higher than a bandwidth of an Asymmetric Digital Subscriber Line (ADSL) network of the network side, in this manner, the part of the data being stored (for example, stored in the cache or the temporary file) can be transmitted to the second apparatus with a faster transmission speed, and finally the streaming media file can still be played smoothly during the handover procedure.

It should be particularly noted that, in the embodiment of the present invention, the "server" is configured to send, to the first apparatus, a cache record list and address information that are of a to-be-played streaming media file, the server may not provide the streaming media file for the first apparatus, but the specialized "streaming media server" provides the streaming media file for the first apparatus; or the "server" may also have a function of the "streaming media server", that is, the "server" may provide the streaming media file for the first apparatus. The "streaming media server" in the specification is configured to send, according to a request message of the first apparatus, the streaming media file to the first apparatus. The streaming media file is stored in the streaming media server. Here, it should be noted that the "server" and the "streaming media server" in the specification are devices in logic, instead of being real physical devices. The "server" and the "streaming media server" may be a physical entity, and may also belong to different physical entities. When being different physical entity, the server and the streaming media server may communicate with each other and transfer necessary information.

Figure 2:
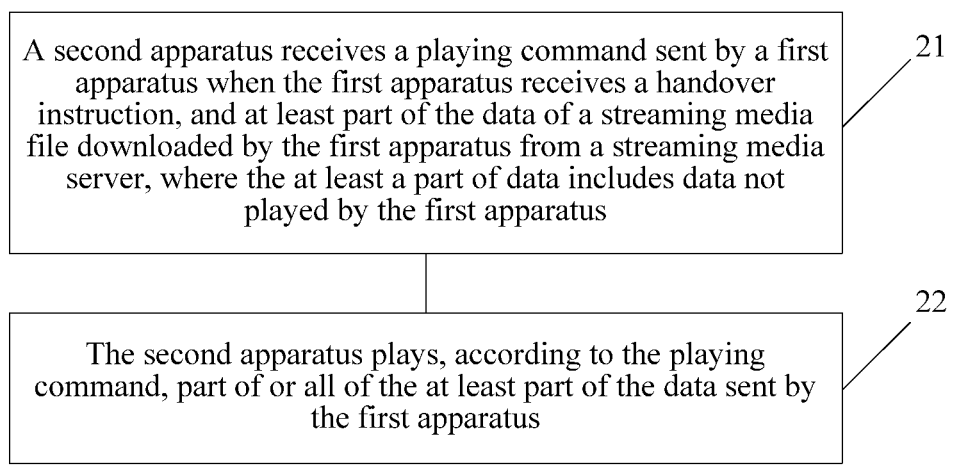
FIG. 2 is a flowchart of another method for playing a streaming media file according to an embodiment of the present invention.

FIG. 2 is a flowchart of a method for playing a streaming media file according to an embodiment of the present invention. Referring to FIG. 2, an embodiment of the present invention provides a method for playing a streaming media file, where the method may include:

21: A second apparatus receives a playing command sent by a first apparatus when the first apparatus receives a handover instruction, and at least a part of the data of a streaming media file downloaded by the first apparatus from a streaming media server, where the at least a part of the data includes data not played by the first apparatus.

22: The second apparatus plays, according to the playing command, a part of or all of the at least a part of the data sent by the first apparatus.

In the method for playing a streaming media file provided by the embodiment of the present invention, the at least a part of the data of the downloaded streaming media file is sent to the second apparatus, where the at least a part of the data includes the data not played by the first apparatus, and therefore, the second apparatus may play a part of or all of the at least a part of the data sent by the first apparatus. In this manner, the part of the data which is of the downloaded streaming media file and is stored in the first apparatus is effectively utilized, thereby reducing a data amount which is of the streaming media file and needs to be acquired by the second apparatus, and improving transmission and playing efficiency of the streaming media file.

In addition, during a playing handover procedure from the first apparatus to the second apparatus, in the prior art, a series of operations, including connection establishment, authentication, capability negotiation, and the like, may be performed between the second apparatus and an Internet media server, and these operations consume time, so situations, such as buffering and delay, occur during the handover procedure, thereby causing playing of a media program to be interrupted, and affecting the viewing experience of a subscriber. However, in the embodiment of the present invention, in this case, when the streaming media file is handed over from the first apparatus to the second apparatus for being played, when performing interaction with the streaming media server to request to transmit data, the second apparatus may play the part of the downloaded streaming media file transmitted by the first apparatus, thereby implementing stable handover of streaming media playing pictures, and preventing the occurrence of buffering and interruption of playing during the handover.

After receiving the handover instruction, the first apparatus may determine, according to whether a cache record list is acquired, whether the downloaded streaming media file is continuous in time, so as to select a subsequent processing manner. Specifically, if acquiring the cache record list from the streaming media server, the first apparatus determines that the downloaded streaming media file is discontinuous in time; on the contrary, if not acquiring the cache record list from the streaming media server, the first apparatus determines that the downloaded streaming media file is continuous in time.

In the following, two situations in which the streaming media file downloaded by the first apparatus is continuous and discontinuous in time are separately described.

Optionally, in an embodiment of the present invention, if the streaming media file downloaded by the first apparatus is continuous in time and is incomplete, besides including the foregoing step 21 and step 22, the method for playing a streaming media file provided by the embodiment of the present invention may further include: receiving, by the second apparatus, first position information and address information that is of the downloaded streaming media file that are sent by the first apparatus, where the first position information indicates a position of a last complete data packet of the downloaded streaming media file; and acquiring, by the second apparatus, according to the first position information and the address information that is of the downloaded streaming media file, a part of or all of the data except for the at least a part of the data from the streaming media server.

Optionally, in another embodiment of the present invention, if the streaming media file downloaded by the first apparatus is discontinuous in time and is incomplete, besides including the foregoing step 21 and step 22, the method for playing a streaming media file provided by the embodiment of the present invention may further include: receiving, by the second apparatus, a cache record list and address information that corresponds to data in a non-cached segment storage block in the cache record list that are sent by the first apparatus; and acquiring, by the second apparatus, according to the cache record list and the address information that corresponds to the data in the non-cached segment storage block, a part of or all of the data except for the at least a part of the data from the streaming media server.

Optionally, in still another embodiment of the present invention, if the streaming media file downloaded by the first apparatus is discontinuous in time and is incomplete, besides including the foregoing step 21 and step 22, the method for playing a streaming media file provided by the embodiment of the present invention may further include: receiving, by the second apparatus, data in a non-cached segment storage block in a cache record list sent by the streaming media server, where the cache record list is sent by the first apparatus to a server.

It should be noted that, in each of the foregoing embodiments, when determining that a data amount or a duration of the downloaded streaming media file satisfies a preset condition, the first apparatus sends the at least a part of the data of the downloaded streaming media file to the second apparatus.

It should be noted that, in each of the foregoing embodiments, the first apparatus and the second apparatus may be in a same local area network. Because a data transmission speed of two apparatuses in the same local area network is quite high, and is generally higher than a bandwidth of an ADSL network of a network side, in this manner, the part of the data being stored (for example, stored in a cache or a temporary file) can be transmitted to the second apparatus with a faster transmission speed, and finally the streaming media file can still be played smoothly during the handover procedure.

In order to better understand the present invention, the present invention is further described in the following by taking specific embodiments as examples. It should also be noted that the embodiments exemplified in the following are only a part of the embodiments of the present invention. Persons of ordinary skill in the art may easily know other embodiments from the content of the present invention, which fall within the scope of the present invention.

Meanwhile, it should be understood that, in the following specific embodiments, description gives emphasis to a situation that a downloaded streaming media file is continuous in time, and because a situation that a downloaded streaming media file is discontinuous in time may be correspondingly obtained according to content described in the specification, no particularly detailed description is given in the specification.

Figure 3A:
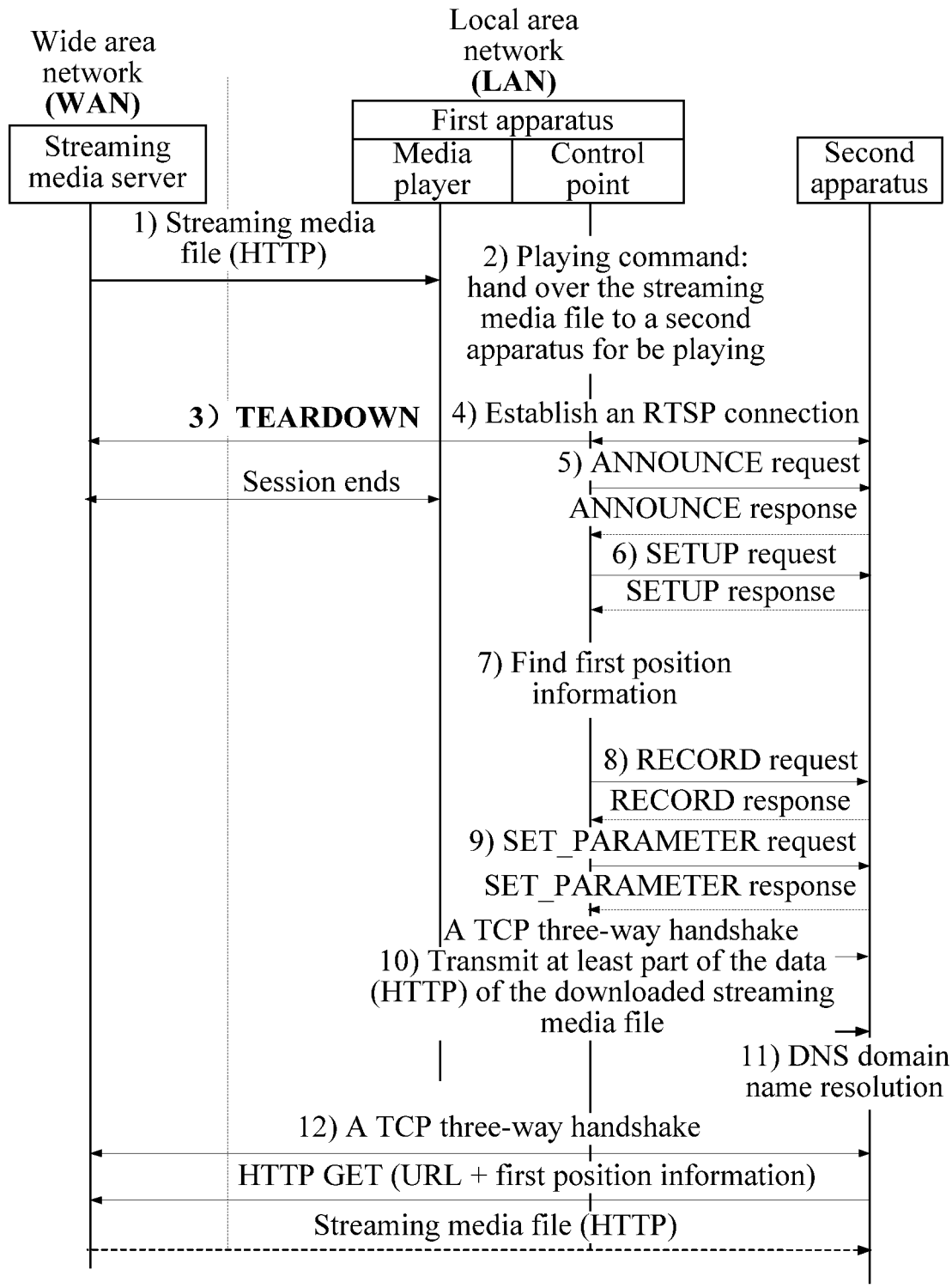
FIG. 3A is a schematic diagram of a method for playing a streaming media file according to an embodiment of the present invention.

FIG. 3A is a schematic diagram of a method for playing a streaming media file according to an embodiment of the present invention. Referring to FIG. 3A, the method includes:

(1) a streaming media server of a wide area network (WAN) side sends a streaming media file to a first apparatus, and the first apparatus plays the streaming media file from the streaming media server;

(2) after receiving a handover instruction, the first apparatus triggers a playing command through a control point on the first apparatus, and hands over the streaming media file to a second apparatus for playing;

(3) the control point on the first apparatus sends a TEARDOWN instruction to the streaming media server, and tears down transmission of the streaming media file, and meanwhile, the session ends;

(4) the first apparatus and the second apparatus establish a Real Time Streaming Protocol (RTSP) connection;

(5) the first apparatus sends an ANNOUNCE request to the second apparatus, where a packet includes session description protocol (SDP) description information (including information such as an encoding format, a size, and a resolution of a media file) of the media file;

(6) the first apparatus sends a SETUP request to the second apparatus, so as to negotiate a port for transferring data of the streaming media file;

(7) the first apparatus finds position information corresponding to a last complete data packet of the data of the streaming media file stored in a cache, namely, first position information;

(8) the first apparatus sends a RECORD request to the second apparatus, where the RECORD request includes a playing stop point and the first position information that are of the streaming media file, and notifies the second apparatus of a to-be-played time region (from the playing stop point to a first position), and the second apparatus opens a data link in a corresponding RECORD response;

(9) the first apparatus sends a SET_PARAMETER request to the second apparatus, and notifies the second apparatus of address information (uniform resource locator (URL)) and the first position information (rtptime) that are of the streaming media file;

(10) after a transport connection protocol (TCP) three-way handshake between the first apparatus and the second apparatus, the first apparatus starts to transmit at least a part of the data of the downloaded streaming media file to the second apparatus;

(11) the second apparatus performs Domain Name System (DNS) domain name resolution on uniform resource locator (URL) information of the received streaming media file, and obtains, through resolution, corresponding IP address information; and

(12) the second apparatus establishes, according to the address information and the corresponding first position information, a session connection with the streaming media server, and after a TCP three-way handshake, the second apparatus requests, from the streaming media server, data which is of the steaming media file and is after the first position information.

In the following, the situation that the downloaded streaming media file is discontinuous in time is described.

For the situation that the downloaded streaming media file is discontinuous in time, a method for playing a streaming media file provided by an embodiment of the present invention may include:

steps (1)-(6) are the same as the foregoing steps (1)-(6);

in addition, a step is added between step (1) and step (2): the first apparatus updates, according to a segment storage block of the steaming media file received from the streaming media server, state information of a segment storage block in a cache record list;

(7) when tearing down the transmission of the streaming media file with the streaming media server, the first apparatus stops updating the cache record list, and saves a newest cache record list;

(8) the first apparatus sends a RECORD request to the second apparatus, where the RECORD request includes a playing stop point of the streaming media file, and notifies the second apparatus of start time for playing, and the second apparatus opens a data link in a corresponding RECORD response;

(9) the first apparatus sends a SET_PARAMETER request to the second apparatus, and notifies the second apparatus of address information (URL) of the streaming media file;

in addition, a step is added between step (9) and step (10): the first apparatus sends the saved newest cache record list to the second apparatus;

steps (10) and (11) are the same as the foregoing step (10) and (11); and

(12) the second apparatus establishes, according to the address information and the cache record list, a session connection with the streaming media server, and after a TCP three-way handshake, the second apparatus requests, according to the state information of the segment storage block indicated in the cache record list, the data of the steaming media file from the streaming media server.

In the method for playing a streaming media file provided by the embodiment of the present invention, in one aspect, the part of the data of the streaming media file stored in the first apparatus is effectively utilized, thereby reducing a data amount requested by the second apparatus from a network side server, and improving transmission and playing efficiency of the streaming media file. In another aspect, when the streaming media file is handed over from the first apparatus to the second apparatus for being played, when performing interaction with an Internet media server to request to transmit data, the second apparatus may play the part of the data which is of the streaming media file and is transmitted by the first apparatus, thereby implementing stable handover of media pictures, and preventing occurrences of buffering and interruption of playing during the handover.

Figure 3B:
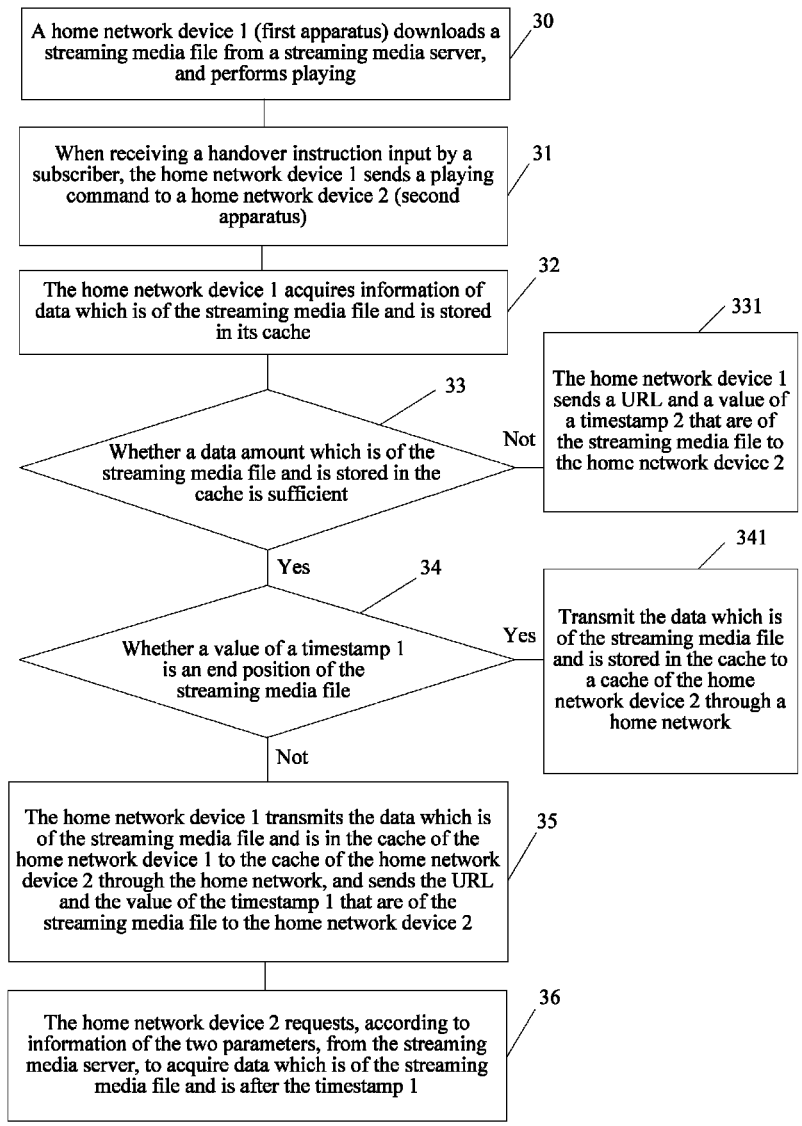
FIG. 3B is a specific flowchart of a method for playing a streaming media file according to an embodiment of the present invention.

The method in FIG. 3A gives the comprehensive description for the method for playing a streaming media file provided by the embodiment of the present invention. In the following, in combination with FIG. 3B, the method for playing a streaming media file provided by the embodiment of the present invention is described with pertinence. Referring to FIG. 3B, this embodiment provides a method for playing a streaming media file, where a home network is taken as an example, and the method includes:

30: A home network device 1 (first apparatus) downloads a streaming media file from a streaming media server, and performs playing.

31: When receiving a handover instruction input by a subscriber, the home network device 1 sends a playing command to a home network device 2 (second apparatus), so as to hand over the streaming media file being played on the home network device 1 to the home network device 2 for playing.

In this embodiment, the home network device 1 and the home network device 2 belong to a subnet of a home network. Before executing the handover instruction, the home network device 1 already finds the home network device 2 and acquires capability information of the home network device 2, so as to determine that the home network device 2 has the capability to play the streaming media file acquired by the home network device 1.

A trigger of the handover instruction may be embedded in a control list of a media player of the home network device 1, and occurs in a form of an icon or a menu bar. When intending to hand over the streaming media file played on the home network device 1 to the home network device 2 for playing, the subscriber only needs to click the corresponding icon or menu bar, and then selects a device name for performing playing (home network device 2), thereby completing the trigger of the handover instruction.

32: The home network device 1 acquires information of data which is of the streaming media file and is stored in its cache.

The information of the data includes a size of the data which is of the streaming media file and is stored in the cache, or corresponding playing time that the data which is of the streaming media file and is stored in the cache, or a start time point and an end time point of the data which is of the streaming media file and is stored in the cache, and the like.

The start time point is a timestamp 2 (that is, an implementation manner of second position information) on which the streaming media file is played when the home network device 1 receives the handover instruction; and the end time point is a timestamp 1 (that is, an implementation manner of first position information) corresponding to a last complete data packet of the data which is of the streaming media file and is stored in the cache. A duration in which the downloaded streaming media file can be played is a difference between the timestamp 1 and the timestamp 2.

33: The home network device 1 determines whether a data amount which is of the streaming media file and is in the cache is sufficient.

If no, execute step 331, which is that the home network device 1 sends a URL and a value of the timestamp 2 that are of the streaming media file to the home network device 2, and the home network device 2 directly requests, from the streaming media server of a network side, the streaming media file after the timestamp 2.

Specifically, the home network device 1 determines, according to the acquired information of the data, whether the data amount which is of the streaming media and is stored in the cache is sufficient. If the data amount which is of the streaming media and is stored in the cache by the home network device 1 is not sufficient, it cannot be ensured that when being handed over to the device 2, the streaming media can be played smoothly, and subsequently, an effect of an operation of transmitting the data in the cache to the device 2 through the home network is not noticeable. In this case, the home network device 1 sends the URL and the timestamp 2 that are of the streaming media to the home network device 2, and the home network device 2 may directly request, according to the two parameters, from the media server of the network side, to acquire the data of the streaming media file.

If yes, continue to execute the following steps.

34: The home network device 1 determines whether a value of the timestamp 1 is an end position of the streaming media file.

If yes, execute step 341, which is that the home network device 1 transmits the data which is of the streaming media file and is stored in the cache to a cache of the home network device 2 through the home network, and the home network device 2 may play the received data.

For example, during a procedure that the streaming media file is played on the home network device 1, when a playing handover operation is executed, it is possible that subsequent remaining data of the streaming media is already downloaded in the cache of the home network device 1. If the situation occurs, the streaming media file is handed over to the home network device 2 for being played, and in this case, the home network device 2 does not need to request, from the streaming media server of the network side, to transmit the data of the streaming media file.

If the value of the timestamp 1 is not the end position of the streaming media file, the home network device 1 continues to execute step 35 and step 36.

35: The home network device 1 transmits the data which is of the streaming media file and is in the cache of the home network device 1 to the cache of the home network device 2 through the home network, and sends the URL and the value of the timestamp 1 that are of the streaming media file to the home network device 2.

36: The home network device 2 requests, according to information of the two parameters, from the streaming media server, to acquire data which is of the streaming media file and is after the timestamp 1.

It should be noted that the situation that the downloaded streaming media file is discontinuous in time is already described in the foregoing, and for details, reference may be made to the corresponding description of the situation that the downloaded streaming media file is discontinuous in time in the foregoing.

Here, it should be noted that, when the home network device 2 establishes a data connection with the media server of the network side, performs interaction and negotiation, and requests and acquires the data of the streaming media, the home network device 2 is playing media content of the data stored in the cache of the home network device 1 in a period of time between the timestamp 1 and the timestamp 2. When the media content is played to the timestamp 1, that is, the data in the cache of the home network device 1 is used up, the home network device 2 has already established the data connection with the media server of the network side, and may already acquire the subsequent data downloaded from the media server. In this way, a problem that playing is not smooth during handover of the streaming media between network devices is solved, and the probability of buffering and interruption of an Internet media program during the device handover is reduced.

It should be noted that, in the embodiment of the present invention, position information may be a position in time, and may be a position in data capacity. In this embodiment, that the timestamp is used the position information (that is, the position information in time) is only taken as an example for description. Definitely, it is obvious that the data capacity may be used as the position information, and because the situation is similar to the situation of this embodiment, detailed description is not given here.

Meanwhile, it should be noted that in this embodiment, that the data of the streaming media file is stored in the cache is only taken as an example for description. Definitely, it is obvious that the data of the streaming media file may also be stored in a temporary file, which is not described in detail in the present invention.

Figure 4:
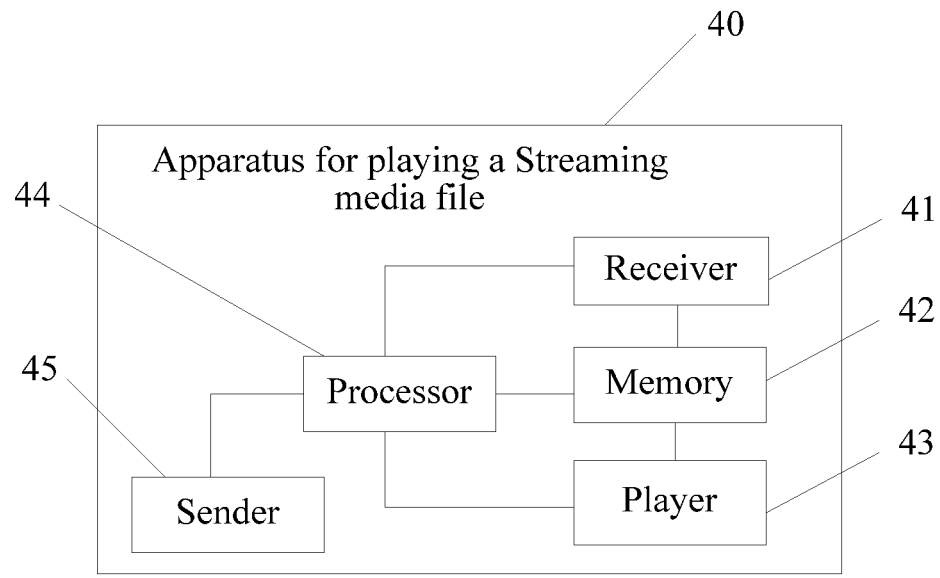
FIG. 4 is a structural block diagram of an apparatus for playing a streaming media file according to an embodiment of the present invention.

As shown in FIG. 4, an embodiment of the present invention further provides an apparatus 40 for playing a streaming media file. The apparatus 40 is a first apparatus and includes a receiver 41, a memory 42, a player 43, a processor 44, and a sender 45, where the receiver 41 is configured to receive a handover instruction; the memory 42 is configured to cache a streaming media file from a streaming media server; the player 43 is configured to play the streaming media file from the streaming media server; the processor 44 is configured to, when the receiver receives the handover instruction, generate a playing command, and determine at least a part of the data which is of the downloaded streaming media file and needs to be sent to a second apparatus, where the playing command is used to instruct the second apparatus to play a part of or all of the at least a part of the data sent by the first apparatus, and the at least a part of the data includes data not played by the first apparatus; and the sender 45 is configured to send, to the second apparatus, the playing command and the at least a part of the data which is of the downloaded streaming media file and is determined by the processor.

In the apparatus for playing a streaming media file provided by the embodiment of the present invention, the at least a part of the data of the downloaded streaming media file is sent to the second apparatus, where the at least a part of the data includes the data not played by the first apparatus, and therefore, the second apparatus may play a part of or all of the at least a part of the data sent by the first apparatus. In this manner, the part of the data which is of the downloaded streaming media file and is stored in the first apparatus is effectively utilized, thereby reducing a data amount which is of the streaming media file and needs to be acquired by the second apparatus, and improving transmission and playing efficiency of the streaming media file.

In addition, during a playing handover procedure from the first apparatus to the second apparatus, in the prior art, a series of operations, including connection establishment, authentication, capability negotiation, and the like, may be performed between the second apparatus and an Internet media server, and these operations consume time, so situations, such as buffering and delays, occur during the handover procedure, thereby causing playing of a media program to be interrupted, and affecting the viewing experience of a subscriber. However, in the embodiment of the present invention, in this case, when the streaming media file is handed over from the first apparatus to the second apparatus for being played, when performing interaction with the streaming media server to request to transmit data, the second apparatus may play the part of the data which is of the downloaded streaming media file and is transmitted by the first apparatus, thereby implementing stable handover of streaming media playing pictures, and preventing the occurrence of buffering and interruption of playing during the handover.

Optionally, in an embodiment of the present invention, the processor 44 is further configured to, if the streaming media file downloaded by the first apparatus is continuous in time, determine first position information of the downloaded streaming media file, where the first position information indicates a position of a last complete data packet of the downloaded streaming media file.

Further, the sender 45 is further configured to, when the downloaded streaming media file is incomplete, and after the receiver receives the handover instruction, send the first position information and address information that is of the downloaded streaming media file to the second apparatus, where the first position information and the address information that is of the streaming media file are used for the second apparatus to acquire a part of or all of the data except for the at least a part of the data from the streaming media server.

Optionally, in another embodiment of the present invention, the receiver 41 is further configured to, when the streaming media file downloaded by the first apparatus is discontinuous in time, receive a cache record list sent by a server, and perform updating; and the sender 45 is further configured to, when the downloaded streaming media file is incomplete, and after the receiver receives the handover instruction, send, to the second apparatus, the updated cache record list and address information that corresponds to data in a non-cached segment storage block in the updated cache record list, where the updated cache record list and the address information that corresponds to the data in the non-cached segment storage block in the updated cache record list are used for the second apparatus to acquire a part of or all of the data except for the at least a part of the data from the streaming media server.

Optionally, in still another embodiment of the present invention, the receiver 41 is further configured to, if the streaming media file downloaded by the first apparatus is discontinuous in time, receive a cache record list sent by a server, and perform updating; and the sender 45 is further configured to, when the downloaded streaming media file is incomplete, and after the receiver receives the handover instruction, send the updated cache record list and address information that is of the second apparatus to the server, where the updated cache record list and the address information that is of the second apparatus are used for the streaming media server to send data in a non-cached segment storage block in the updated cache record list to the second apparatus.

In each embodiment of the apparatus 40 for playing a streaming media file according to the present invention, the sender 45 may be specifically configured to, when the first apparatus determines that a data amount or a duration of the downloaded streaming media file satisfies a preset condition, send the at least a part of the data of the downloaded streaming media file to the second apparatus.

It should be noted that in the embodiment, preferably, the apparatus 40 for playing a streaming media file and the second apparatus may be in a same local area network. Relevant description in the method embodiment is also applicable to the apparatus embodiment, and details are not repeatedly described herein.

Figure 5:
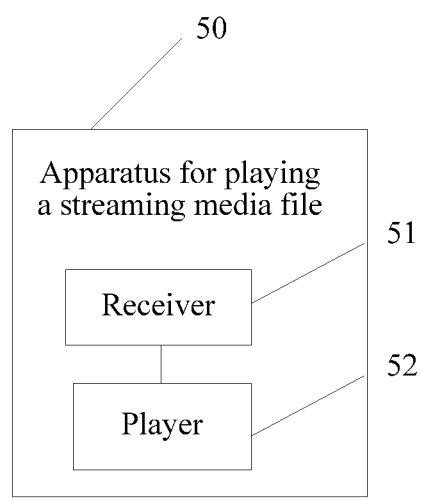
FIG. 5 is another structural block diagram of an apparatus for playing a streaming media file according to an embodiment of the present invention.

As shown in FIG. 5, an embodiment of the present invention further provides an apparatus 50 for playing a streaming media file. The apparatus 50 includes a receiver 51 and a player 52, where the receiver 51 is configured to receive a playing command sent by a first apparatus when the first apparatus receives a handover instruction, and at least a part of the data of a streaming media file downloaded by the first apparatus from a streaming media server, where the at least a part of the data includes data not played by the first apparatus; and the player 52 is configured to play, according to the playing command, a part of or all of the at least a part of the data sent by the first apparatus.

In the apparatus for playing a streaming media file provided by the embodiment of the present invention, the at least a part of the data of the downloaded streaming media file is sent to the second apparatus, where the at least a part of the data includes the data not played by the first apparatus, and therefore, the second apparatus may play a part of or all of the at least a part of the data sent by the first apparatus. In this manner, the part of the data which is of the downloaded streaming media file and is stored in the first apparatus is effectively utilized, thereby reducing a data amount which is of the streaming media file and needs to be acquired by the second apparatus, and improving transmission and playing efficiency of the streaming media file.

In addition, during a playing handover procedure from the first apparatus to the second apparatus, in the prior art, a series of operations, including connection establishment, authentication, capability negotiation, and the like, may be performed between the second apparatus and an Internet media server, and these operations consume time, so situations, such as buffering and delays, occur during the handover procedure, thereby causing playing of a media program to be interrupted, and affecting a viewing experience of a subscriber. However, in the embodiment of the present invention, in this case, when the streaming media file is handed over from the first apparatus to the second apparatus for being played, when performing interaction with the streaming media server to request to transmit data, the second apparatus may play the part of the data which is of the downloaded streaming media file and is transmitted by the first apparatus, thereby implementing stable handover of streaming media playing pictures, and preventing the occurrence of buffering and interruption of playing during the handover.

Optionally, in an embodiment of the present invention, the receiver 51 is further configured to, when the streaming media file downloaded by the first apparatus is continuous in time and is incomplete, receive first position information and address information that is of the downloaded streaming media file that are sent by the first apparatus, and acquire, according to the first position information and the address information that is of the downloaded streaming media file, a part of or all of the data except for the at least a part of the data from the streaming media server, where the first position information indicates a position of a last complete data packet of the downloaded streaming media file.

Optionally, in another embodiment of the present invention, the receiver 51 is further configured to, when the streaming media file downloaded by the first apparatus is discontinuous in time and is incomplete, receive a cache record list and address information that corresponds to data in a non-cached segment storage block in the cache record list that are sent by the first apparatus, and acquire, according to the cache record list and the address information that corresponds to the data in the non-cached segment storage block, a part of or all of the data except for the at least a part of the data from the streaming media server.

Optionally, in still another embodiment of the present invention, the receiver 51 is further configured to, when the streaming media file downloaded by the first apparatus is discontinuous in time and is incomplete, receive data in a non-cached segment storage block in a cache record list sent by the streaming media server, where the cache record list is sent by the first apparatus to a server.

In each embodiment of the apparatus 50 for playing a streaming media file according to the present invention, the receiver 51 is specifically configured to, when the first apparatus determines that a data amount or a duration of the downloaded streaming media file satisfies a preset condition, receive the at least a part of the data which is of the downloaded streaming media file and is sent by the first apparatus.

In the embodiment, preferably, the apparatus 50 for playing a streaming media file and the first apparatus may be in a same local area network.

It is noted that the apparatus for playing a streaming media file provided by the embodiment of the present invention corresponds to the method for playing a streaming media file described in the specification, and because the method for playing a streaming media file is described in detail in the foregoing, relevant description in the method embodiment is also applicable to the apparatus embodiment, and details are not repeatedly described herein.

Persons of ordinary skill in the art should understand that all or a part of the steps of the method according to the foregoing embodiments may be implemented by a program instructing relevant hardware. The program may be stored in a computer readable storage medium. The storage medium may be, for example, a read-only memory, a magnetic disk, or an optical disk.

The foregoing description is merely specific implementation manners of the present invention, but is not intended to limit the protection scope of the present invention. Any variation or replacement made by persons skilled in the art within the technical scope disclosed in the present invention shall fall within the protection scope of the present invention. Therefore, the protection scope of the present invention is subject to the protection scope of the claims.

What is claimed is:

1. A method for playing a streaming media file, comprising:

downloading, by a first apparatus, a streaming media file from a streaming media server;

playing, by the first apparatus, the download streaming media file;

sending, by the first apparatus, a playing command to a second apparatus so as to hand over the streaming media file being played on the first apparatus to the second apparatus for playing when the first apparatus receives a handover instruction input by a subscriber, wherein the first apparatus and the second apparatus belong to a subnet of a home network;

acquiring, by the first apparatus, information of data which is of the streaming media file and is stored in a cache of the first apparatus;

wherein the information of data which is of the streaming media file and is stored in the cache comprises a size of the data which is of the streaming media file and is stored in the cache or a start time point and an end time point of the data which is of the streaming media file and is stored in the cache, wherein the start time point a timestamp 2 on which the streaming media file is played when the first apparatus receives the handover instruction, and wherein the end time point is a timestamp 1 corresponding to a last complete data packet of the data which is of the streaming media file and is stored in the cache;

determining by the first apparatus, whether a data amount which is of the streaming media file and is stored in the cache is sufficient to play according to the acquired information of data which is of the streaming media file and is stored in the cache;

sending, by the first apparatus, a uniform resource locator (URL) and a value of the timestamp 2 that are of the streaming media file to the second apparatus when the data amount which is of the streaming media file and is stored in the cache is not sufficient to play;

determining, by the first apparatus, whether a value of the timestamp 1 is an end position of the streaming media file when the data amount which is of the streaming media file and is stored in the cache is sufficient to play;

sending, by the first apparatus, the data which is of the streaming media file and is stored in the cache to the second apparatus through the home network when the value of the timestamp 1 is an end position of the streaming media file; and sending, by the first apparatus, the data which is of the streaming media file and is stored in the cache of the first apparatus, the URL, and the value of the timestamp 1 that are of the streaming media file to the second apparatus through the home network when the value of the timestamp 1 is not the end position of the streaming media file for the second apparatus to request from the streaming media server according to information of the URL and the timestamp 1, data which is of the streaming media file and is after the timestamp 1.

2. The method according to claim 1, wherein the first apparatus is a smartphone, a tablet computer, or a personal digital assistant (PDA).

3. The method according to claim 1, wherein the second apparatus is a high definition smart television.

4. The method according to claim 1, wherein handing over playback of the streaming media file from the first apparatus to the second apparatus according to the handover instruction is not noticeable in the playing of the streaming media file such that playing of the streaming media file continues smoothly.

5. An apparatus for playing a streaming media file, wherein the apparatus is a first apparatus and comprises:
- a receiver configured to download a streaming media file from a streaming media server;
- a memory coupled to the receiver and configured to store the downloaded streaming media file;
- a display coupled to the memory and configured to play the downloaded streaming media file;
- an interface configured to receive a handover instruction input by a subscriber;
- a transmitter coupled to the memory and the interface and configured to send a playing command to a second apparatus so as to hand over the streaming media file being played on the first apparatus to the second apparatus for playing when the handover instruction is received, wherein the first apparatus and the second apparatus belong to a subnet of a home network,
- wherein the receiver is further configured to acquire information of data which is of the streaming media file and is stored in the memory, wherein the information of data which is of the streaming media file and is stored in the memory comprises a size of the data which is of the streaming media file and is stored in the memory, or a start time point and an end time point of the data which is of the streaming media file and is stored in the memory, wherein the start time point is a timestamp 2 on which the streaming media file is played when the first apparatus receives the handover instruction, and wherein the end time point is a timestamp 1 corresponding to a last complete data packet of the data which is of the streaming media file and is stored in the memory; and
- a computer processor configured to:
  - determine whether a data amount which is of the streaming media file and is stored in the memory is sufficient to play according to the acquired information of data which is of the streaming media file and is stored in the memory; and
  - determine whether a value of the timestamp 1 is an end position of the streaming media file when the data amount which is of the streaming media file and is stored in the memory is sufficient to play,
- wherein the transmitter is further configured to:
  - send a uniform resource locator (URL) and a value of the timestamp 2 that are of the streaming media file to the second apparatus when the data amount which is of the streaming media file and is stored in the memory is not sufficient to play;
  - send the data which is of the streaming media file and is stored in the memory to the second apparatus through the home network when the value of a timestamp 1 is an end position of the streaming media file; and
  - send the data which is of the streaming media file and is stored in the memory of the first apparatus, the URL, and the value of the timestamp 1 that are of the streaming media file to the second apparatus through the home network for the second apparatus to request from the streaming media server according to information of the URL and the timestamp 1, data which is of the streaming media file and is after the timestamp 1 when the value of the timestamp 1 is not the end position of the streaming media file.

6. The apparatus according to claim 5, wherein the first apparatus is a smartphone, a tablet computer, or a personal digital assistant (PDA).

7. The apparatus of claim 5, wherein handing over playback of the streaming media file from the first apparatus to the second apparatus according to the handover instruction does not interrupt playing of the streaming media file such that playing of the streaming media file continues smoothly.

* * * * *